US012660052B2

(12) United States Patent
Lu et al.

(10) Patent No.: US 12,660,052 B2
(45) Date of Patent: Jun. 16, 2026

(54) LIGHTING DEVICE WITH ADAPTIVE POWER ADJUSTMENT FUNCTION

(71) Applicant: Xiamen PVTECH Co., Ltd., Xiamen (CN)

(72) Inventors: Fuxing Lu, Xiamen (CN); Chun Ming Liu, Xiamen (CN)

(73) Assignee: Xiamen PVTECH Co., Ltd., Xiamen (CN)

(*) Notice: Subject to any disclaimer, the term of this patent is extended or adjusted under 35 U.S.C. 154(b) by 16 days.

(21) Appl. No.: 18/773,513

(22) Filed: Jul. 15, 2024

(65) Prior Publication Data

US 2025/0056690 A1 Feb. 13, 2025

(30) Foreign Application Priority Data

Aug. 11, 2023 (CN) ......................... 202311017126.5

(51) Int. Cl.

| | |
|---|---|
| ***H05B 45/10*** | (2020.01) |
| ***H05B 45/14*** | (2020.01) |
| ***H05B 45/345*** | (2020.01) |
| ***H05B 45/375*** | (2020.01) |
| ***H05B 47/19*** | (2020.01) |

(52) U.S. Cl.
CPC ........... *H05B 45/14* (2020.01); *H05B 45/345* (2020.01); *H05B 45/375* (2020.01); *H05B 47/19* (2020.01)

(58) Field of Classification Search
CPC ........ H05B 45/10; H05B 45/14; H05B 45/30; H05B 45/345; H05B 47/10; H05B 47/19
See application file for complete search history.

(56) References Cited

U.S. PATENT DOCUMENTS

2013/0147269 A1* 6/2013 Zimmermann ...... H05B 45/382 315/86

FOREIGN PATENT DOCUMENTS

| | | | |
|---|---|---|---|
| JP | 2010-118319 A | | 5/2010 |
| JP | 2011216679 A | * | 10/2011 |
| JP | 2013-118130 A | | 6/2013 |
| JP | 2020-198222 A | | 12/2020 |
| JP | 2022-187764 A | | 12/2022 |

* cited by examiner

*Primary Examiner* — Jimmy T Vu
(74) *Attorney, Agent, or Firm* — BruceStone LLP; Joseph A. Bruce

(57) ABSTRACT

A lighting device with adaptive power adjustment function includes a constant-voltage isolation circuit, a DC/DC constant-current power circuit, a controller and a load. The constant-voltage isolation circuit is connected to an external power source. The DC/DC constant-current power circuit is connected to the constant-voltage isolation circuit. The controller is connected to the DC/DC constant-current power circuit. The load includes a plurality of load units. The load is connected to the controller and the DC/DC constant-current power circuit. The controller detects the operational status of each of the load units to generate a detection result, and controls the DC/DC constant-current power circuit according to the detection result so as to adjust a total output power.

8 Claims, 5 Drawing Sheets

LIGHTING DEVICE WITH ADAPTIVE POWER ADJUSTMENT FUNCTION

BACKGROUND OF THE INVENTION

1. Field of the Invention

The present invention relates to a lighting device, in particular to a lighting device with adaptive power adjustment function.

2. Description of the Prior Art

With the growing environmental awareness, energy conservation and environmental protection have become common goals of all countries in the world. Lighting devices account for approximately 20% of the total power consumption, so reducing the power consumption of lighting devices has become an important goal for energy saving. In pursuit of this goal, various energy-saving lighting devices have been developed. However, these currently available lighting devices still have many shortcomings that need to be solved.

For example, the currently available lighting devices lack the adaptive power adjustment function, so it is difficult to effectively match the quantity of light sources with the total output power thereof. Therefore, if a currently available lighting device has multiple light sources and one of the light sources malfunctions, the other light sources also tend to malfunction. As a result, it is necessary to frequently replace the light sources of the lighting device, failing to achieve high resource utilization rates, and the reliability thereof cannot be effectively improved.

Additionally, as the currently available lighting devices lack the adaptive power adjustment function, these lighting devices cannot operate efficiently.

SUMMARY OF THE INVENTION

One embodiment of the present invention provides a lighting device with adaptive power adjustment function, which includes a constant-voltage isolation circuit, a DC/DC constant-current power circuit, a controller and a load. The constant-voltage isolation circuit is connected to an external power source. The DC/DC constant-current power circuit is connected to the constant-voltage isolation circuit. The controller is connected to the DC/DC constant-current power circuit. The load includes a plurality of load units. The load is connected to the controller and the DC/DC constant-current power circuit. The controller detects the operational status of each of the load units to generate a detection result, and controls the DC/DC constant-current power circuit according to the detection result so as to adjust a total output power.

In one embodiment, the detection result is the number of the load units not malfunctioning among the load units.

In one embodiment, the controller multiplies the number of the load units not malfunctioning by a default power unit to obtain the total output power.

In one embodiment, the load units are light-emitting diode light source modules.

In one embodiment, the lighting device further includes a DC/DC constant-voltage power circuit and a connector. The DC/DC constant-voltage power circuit is connected to the constant-voltage isolation circuit and the controller. The connector is connected to the DC/DC constant-voltage power circuit and the controller.

In one embodiment, the lighting device further includes a buck converter circuit. The DC/DC constant-voltage power circuit is connected to the controller via the buck converter circuit.

In one embodiment, the lighting device further includes a dimming circuit connected to the connector.

In one embodiment, the lighting device further includes an intelligent module connected to the connector.

In one embodiment, the intelligent module is a Bluetooth controller, a WiFi controller, a ZigBee controller, an infrared sensor, or a microwave sensor.

In one embodiment, the controller is a microcontroller unit, central processing unit, an application-specific integrated circuit, or a field programmable gate array.

The lighting device with adaptive power adjustment function in accordance with the embodiments of the present invention may have the following advantages:

(1) In one embodiment of the present invention, the lighting device includes a constant-voltage isolation circuit, a DC/DC constant-current power circuit, a controller and a load. The constant-voltage isolation circuit is connected to an external power source. The DC/DC constant-current power circuit is connected to the constant-voltage isolation circuit. The controller is connected to the DC/DC constant-current power circuit. The load includes a plurality of load units. The load is connected to the controller and the DC/DC constant-current power circuit. The controller detects the operational status of each of the load units to generate a detection result, and controls the DC/DC constant-current power circuit according to the detection result so as to adjust a total output power. Therefore, the lighting device can provide the adaptive power adjustment function in order to make sure that the total output power of the lighting device always matches the load units not malfunctioning, which can reduce the failure rate of these load units. Consequently, the lighting device can achieve high resource utilization rates, and the reliability thereof can be effectively enhanced.

(2) In one embodiment of the present invention, the lighting device has the adaptive power adjustment function, such that the total output power of the lighting device always matches the load units not malfunctioning. Through this adaptive power adjustment function, the lighting device can operate efficiently. Therefore, the lighting device can save more energy, so the lighting device can conform to the future development trend.

(3) In one embodiment of the present invention, the DC/DC constant-current power circuit of the lighting device is connected to an external power source via the constant-voltage isolation circuit. The combination of the DC/DC constant-current power circuit and the constant-voltage isolation circuit effectively prevents the lighting device from producing flickering, which can provide the user with a better user experience so as to meet actual requirements.

(4) In one embodiment of the present invention, the lighting device has a connector, which can be used to connect an intelligent module and/or a dimming circuit. The intelligent module may be a Bluetooth controller, WiFi controller, ZigBee controller, infrared sensor, microwave sensor, or similar component. Therefore, the lighting device can achieve various intelligent control and/or intelligent dimming functions in order to meet the requirements of various intelligent applications. Consequently, the lighting device can be more comprehensive in applicant and more flexible in use.

(5) In one embodiment of the present invention, the design of the lighting device is simple and the lighting device has a specially-designed adaptive power adjustment function. Thereof, the lighting device can achieve the desired technical effects without significantly increasing the cost thereof, Therefore, the lighting device can effectively address the problems of prior art.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
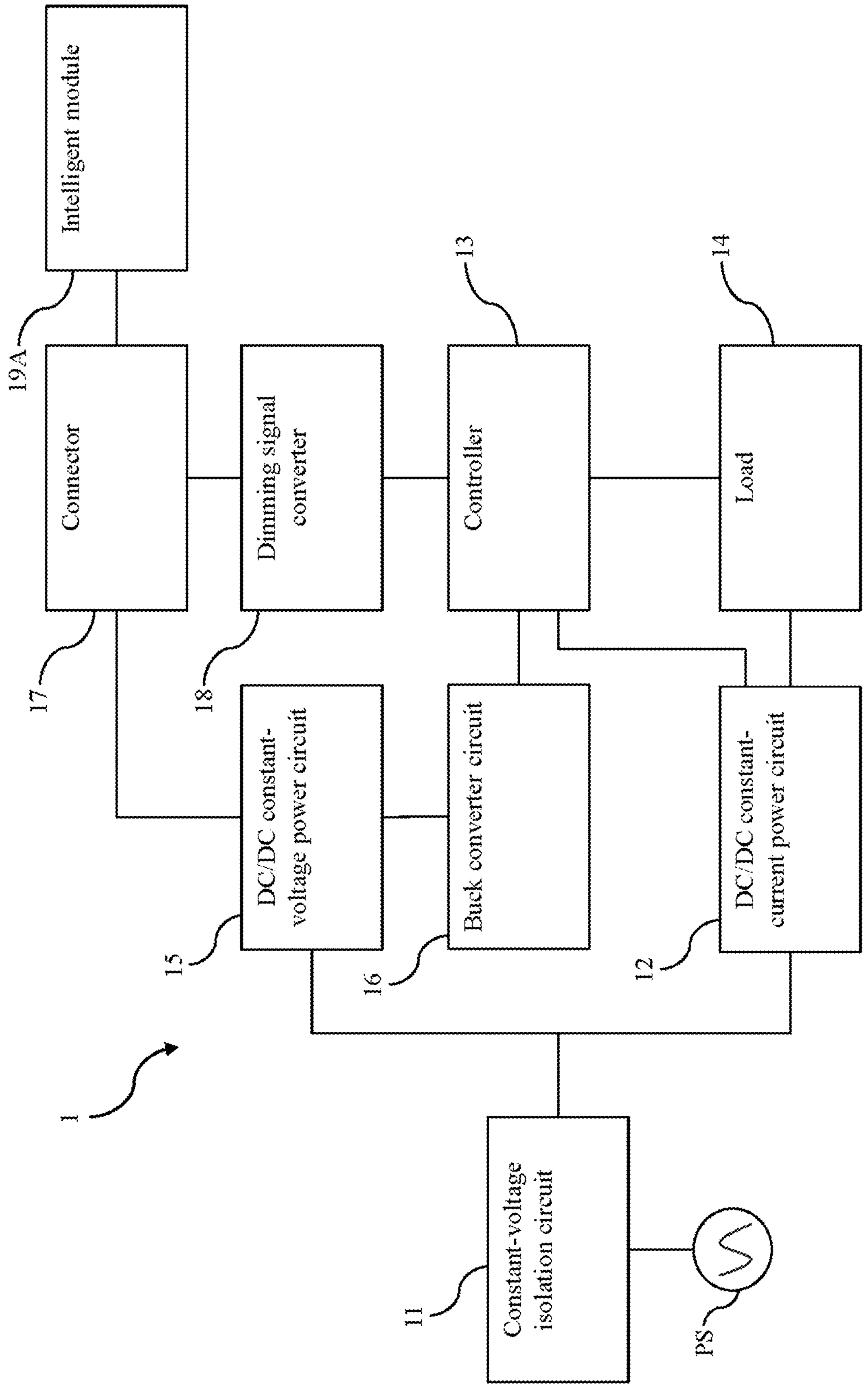
FIG. 1 is a block diagram of a lighting device with adaptive power adjustment function in accordance with one embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Please refer to FIG. 1, which is a block diagram of a lighting device with adaptive power adjustment function in accordance with one embodiment of the present invention. As shown in FIG. 1, the lighting device 1 includes a constant-voltage isolation circuit 11, a DC/DC constant-current power circuit 12, a controller 13, a load 14, a DC/DC constant-voltage power circuit 15, a buck converter circuit 16, a connector 17, a dimming signal converter 18, and an intelligent module 19A.

The constant-voltage isolation circuit 11 is connected to an external power source PS. In this embodiment, the external power source PS can be a utility power. In another embodiment, the external power source PS can be a renewable energy source, a generator, or similar components. The constant-voltage isolation circuit 11 isolates other circuits of the lighting device 1 from the external power source PS, performs voltage reduction, and converts the input voltage of the external power source PS into direct current voltage. In one embodiment, the constant-voltage isolation circuit 11 may include a constant-voltage control circuit and a low-voltage current-limiting control circuit.

The DC/DC constant-current power circuit 12 is connected to the constant-voltage isolation circuit 11. In one embodiment, the DC/DC constant-current power circuit 12 may be a buck converter, a boost converter, a buck-boost converter, or similar components.

The controller 13 is connected to the DC/DC constant-current power circuit 12. In one embodiment, the controller 13 may be a microcontroller (MCU), a central processing unit (CPU), an application-specific integrated circuit (ASIC), a field-programmable gate array (FPGA), or similar components.

The load 14 includes a plurality of load units. The load 14 is connected to the controller 13 and the DC/DC constant-current power circuit 12. The load units mentioned above are light-emitting diode (LED) light source modules, each of which includes one or more LEDs.

The DC/DC constant-voltage power circuit 15 is connected to the constant-voltage isolation circuit 11 and is connected to the controller 13 via the buck converter circuit 16. In one embodiment, the DC/DC constant-voltage power circuit 15 may be a 12V DC/DC converter or similar components. In one embodiment, the buck converter circuit 16 may be a low-dropout regulator or similar components.

The connector 17 is connected to the DC/DC constant-voltage power circuit 15 and is connected to the controller 13 via the dimming signal converter 18. In one embodiment, the connector 17 may be an RJ11 interface. In another embodiment, the connector 17 may be a USB interface or similar components.

The intelligent module 19A is detachably connected to the connector 17. In one embodiment, the intelligent module 19A may be a Bluetooth controller, a WiFi controller, a ZigBee controller, an infrared sensor, a microwave sensor, or similar components.

The embodiment just exemplifies the present invention and is not intended to limit the scope of the present invention; any equivalent modification and variation according to the spirit of the present invention is to be also included within the scope of the following claims and their equivalents.

Figure 2:
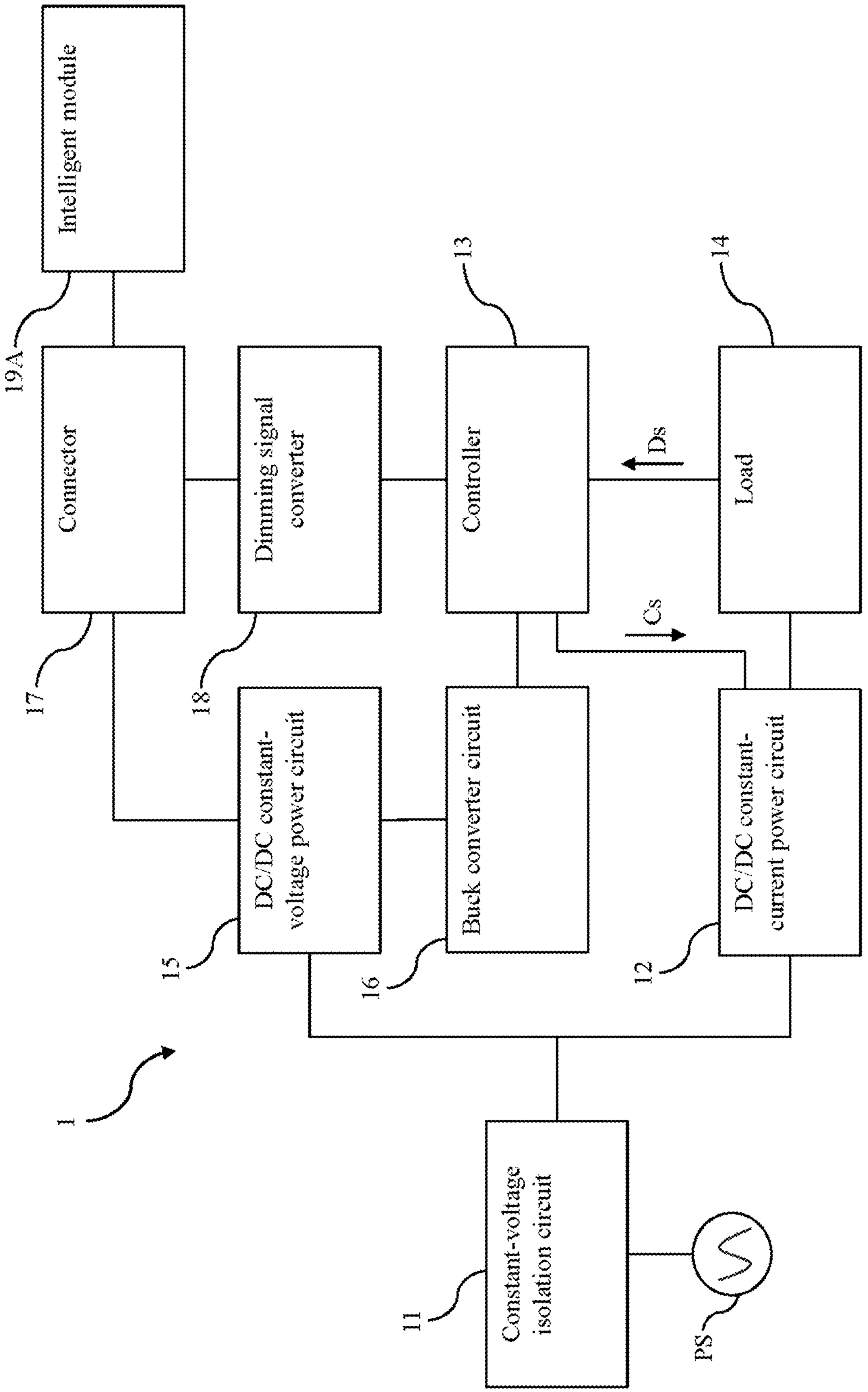
FIG. 2 is a first schematic view of the lighting device in operation in accordance with one embodiment of the present invention.

Please refer to FIG. 2, which is a first schematic view of the lighting device in operation in accordance with one embodiment of the present invention. As shown in FIG. 2, the controller 13 detects the operational status of each load unit of the load 14 to generate a detection result Ds. Then, the controller 13 generates a control signal Cs based on the detection result Ds to control the DC/DC constant-current power circuit 12 to adjust the total output power.

The aforementioned detection result Ds represents the number of load units not malfunctioning among the multiple load units of the load 14. The controller 13 multiplies the number of the load units not malfunctioning by the default power unit to obtain the total output power, as shown in Equation (1) given below:

$$PT = L \times Pu \tag{1}$$

In Equation (1), PT stands for the total output power; L stands for the number of the load units not malfunctioning; Pu stands for the default power unit. The default power unit can be the power required by one load unit. For example, if the load 14 has 5 load units, and the detection result Ds indicates that the number of the load units not malfunctioning is 3. In this case, the controller 13 calculates the total output power as 30 W (3*10 W; the default power unit in this embodiment is 10 W) according to Equation (1).

For instance, if the load 14 has 5 load units, and the detection result Ds indicates that the number of the load units not malfunctioning is 2. In this case, the controller 13 calculates the total output power as 20 W (2*10 W) according to Equation (1). Therefore, the lighting device 1 can achieve adaptive power adjustment function through the aforementioned mechanism.

As described above, in this embodiment, the lighting device 1 has the adaptive power adjustment function, enabling the total output power of the lighting device 1 to always match the load units not malfunctioning, thereby reducing the failure rate of these load units. Therefore, the lighting device 1 can achieve high resource utilization and effectively enhance the reliability thereof.

Additionally, in this embodiment, the lighting device 1 has the adaptive power adjustment function, enabling the total output power of the lighting device 1 to always match the load units not malfunctioning. Through the adaptive power adjustment function mentioned above, the lighting device 1 can operate efficiently. Therefore, the lighting device 1 can be more energy-efficient, aligning with future development trends.

Furthermore, in this embodiment, the DC/DC constant-current power circuit 12 of the lighting device 1 is connected to the external power source PS through the constant-voltage isolation circuit 11. The combination of the DC/DC constant-current power circuit 12 and the constant-voltage isolation circuit 11 effectively prevents the lighting device 1 from generating flicker, thereby providing the user with a better user experience to meet practical application needs.

The embodiment just exemplifies the present invention and is not intended to limit the scope of the present invention; any equivalent modification and variation according to the spirit of the present invention is to be also included within the scope of the following claims and their equivalents.

Figure 3:
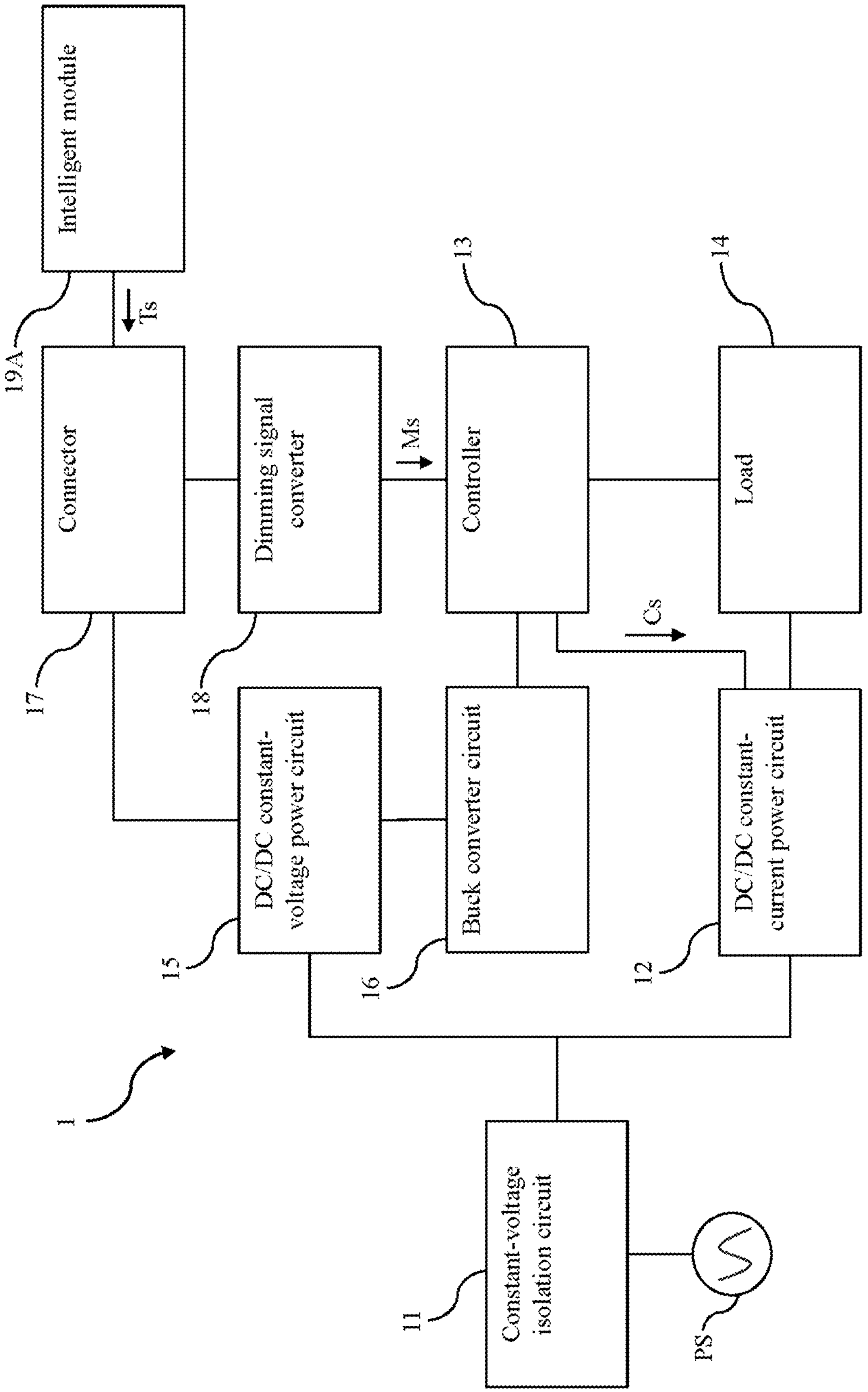
FIG. 3 is a second schematic view of the lighting device in operation in accordance with one embodiment of the present invention.

Please refer to FIG. 3, which is a second schematic view of the lighting device in operation in accordance with one embodiment of the present invention. As shown in FIG. 3, the intelligent module 19A can perform a human body detection function to generate a human body detection signal Ts. For example, the intelligent module 19A can be a microwave sensor. Then, the dimming signal converter 18 converts the human body detection signal Ts into a modulation signal Ms (such as PWM signal). Subsequently, the controller 13 generates a control signal Cs based on the modulation signal Ms to control the DC/DC constant-current power circuit 12, thereby achieving the dimming function (increasing the brightness of the lighting device 1).

In another embodiment, the intelligent module 19A can also directly receive remote a remote-control signal (for example, the intelligent module 19A can be a Bluetooth sensor). The user can operate an electronic device (such as smartphone, tablet, etc.) to transmit the remote-control signal to the intelligent module 19A. Then, the dimming signal converter 18 converts the remote-control signal into a modulation signal Ms (such as PWM signal). Subsequently, the controller 13 generates a control signal Cs based on the modulation signal Ms to control the DC/DC constant-current power circuit 12, thereby achieving the dimming function (increasing or decreasing the brightness of the lighting device 1).

The embodiment just exemplifies the present invention and is not intended to limit the scope of the present invention; any equivalent modification and variation according to the spirit of the present invention is to be also included within the scope of the following claims and their equivalents.

It is worthy to point out that the currently available lighting devices lack the adaptive power adjustment function, so it is difficult to effectively match the quantity of light sources with the total output power thereof. Therefore, if a currently available lighting device has multiple light sources and one of the light sources malfunctions, the other light sources also tend to malfunction. As a result, it is necessary to frequently replace the light sources of the lighting device, failing to achieve high resource utilization rates, and the reliability thereof cannot be effectively improved. Additionally, as the currently available lighting devices lack the adaptive power adjustment function, these lighting devices cannot operate efficiently. By contrast, according to one embodiment of the present invention, the lighting device includes a constant-voltage isolation circuit, a DC/DC constant-current power circuit, a controller and a load. The constant-voltage isolation circuit is connected to an external power source. The DC/DC constant-current power circuit is connected to the constant-voltage isolation circuit. The controller is connected to the DC/DC constant-current power circuit. The load includes a plurality of load units. The load is connected to the controller and the DC/DC constant-current power circuit. The controller detects the operational status of each of the load units to generate a detection result, and controls the DC/DC constant-current power circuit according to the detection result so as to adjust a total output power. Therefore, the lighting device can provide the adaptive power adjustment function in order to make sure that the total output power of the lighting device always matches the load units not malfunctioning, which can reduce the failure rate of these load units. Consequently, the lighting device can achieve high resource utilization rates, and the reliability thereof can be effectively enhanced.

Besides, according to one embodiment of the present invention, the lighting device has the adaptive power adjustment function, such that the total output power of the lighting device always matches the load units not malfunctioning. Through this adaptive power adjustment function, the lighting device can operate efficiently. Therefore, the lighting device can save more energy, so the lighting device can conform to the future development trend.

Further, according to one embodiment of the present invention, the DC/DC constant-current power circuit of the lighting device is connected to an external power source via the constant-voltage isolation circuit. The combination of the DC/DC constant-current power circuit and the constant-voltage isolation circuit effectively prevents the lighting device from producing flickering, which can provide the user with a better user experience so as to meet actual requirements.

Moreover, according to one embodiment of the present invention, the lighting device has a connector, which can be used to connect an intelligent module and/or a dimming circuit. The intelligent module may be a Bluetooth controller, WiFi controller, ZigBee controller, infrared sensor, microwave sensor, or similar component. Therefore, the lighting device can achieve various intelligent control and/or intelligent dimming functions in order to meet the requirements of various intelligent applications. Consequently, the lighting device can be more comprehensive in applicant and more flexible in use.

Furthermore, according to one embodiment of the present invention, the design of the lighting device is simple and the lighting device has a specially-designed adaptive power adjustment function. Thereof, the lighting device can achieve the desired technical effects without significantly increasing the cost thereof, Therefore, the lighting device can effectively address the problems of prior art. As set forth above, the lighting device according the embodiments of the present invention can definitely achieve great technical effects.

Figure 4:
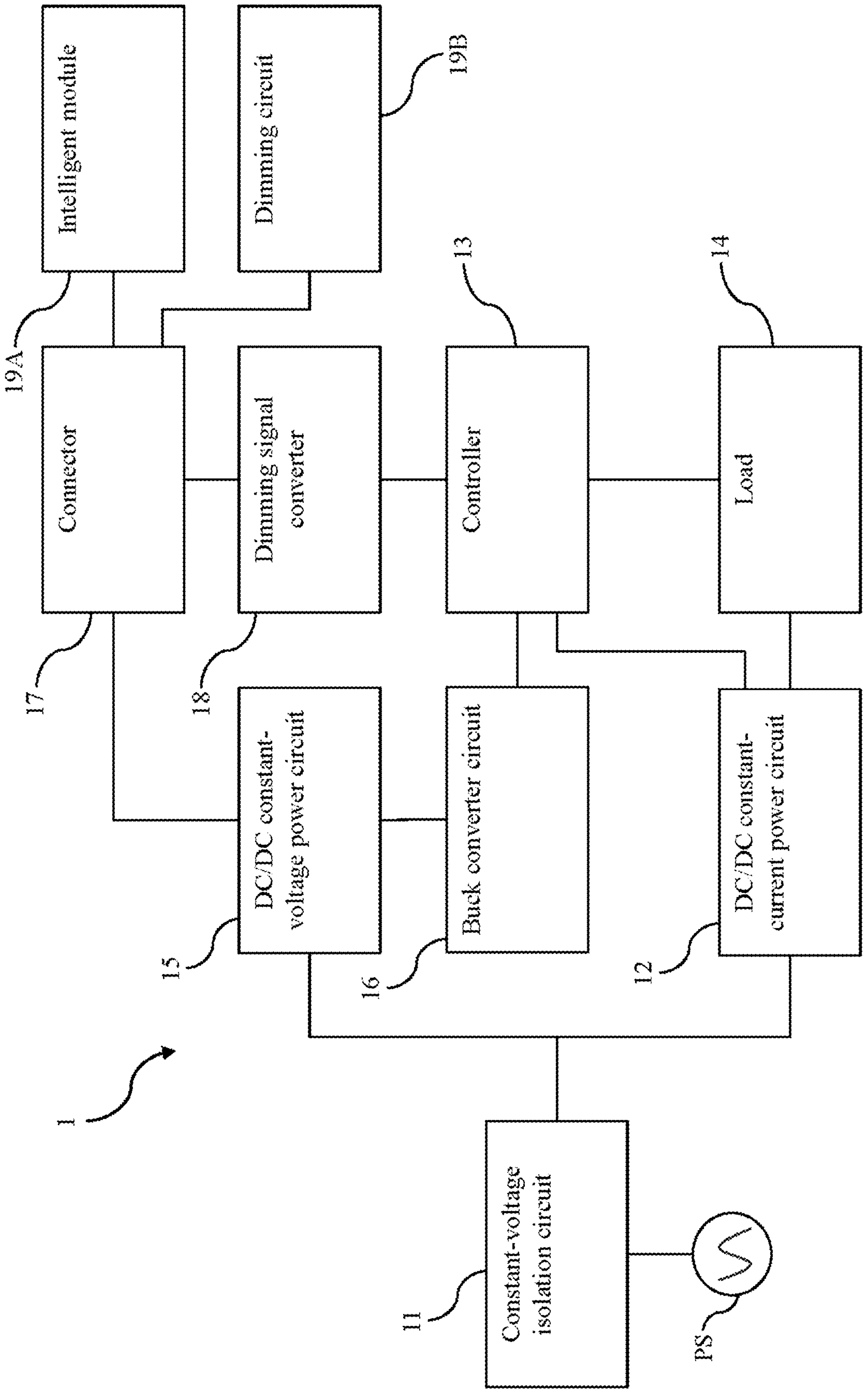
FIG. 4 is a block diagram of a lighting device with adaptive power adjustment function in accordance with another embodiment of the present invention.

Please refer to FIG. 4, which is a block diagram of a lighting device with adaptive power adjustment function in accordance with another embodiment of the present invention. As shown in FIG. 4, the lighting device 1 includes a constant-voltage isolation circuit 11, a DC/DC constant-current power circuit 12, a controller 13, a load 14, a DC/DC constant-voltage power circuit 15, a buck converter circuit 16, a connector 17, a dimming signal converter 18, and an intelligent module 19A.

The constant-voltage isolation circuit 11 is connected to an external power source PS. The DC/DC constant-current power circuit 12 is connected to the constant-voltage isolation circuit 11. The controller 13 is connected to the DC/DC constant-current power circuit 12. The load 14 includes a plurality of load units. The load 14 is connected to the controller 13 and the DC/DC constant-current power circuit 12. The DC/DC constant-voltage power circuit 15 is connected to the constant-voltage isolation circuit 11 and connected to the controller 13 via the buck converter circuit 16. The connector 17 is connected to the DC/DC constant-voltage power circuit 15 and connected to the controller 13 via the dimming signal converter 18. The intelligent module 19A is detachably connected to the connector 17.

The above elements are similar to those in the previous embodiments, so these elements are not further described here. The difference between this embodiment and the previous embodiment is that the lighting device 1 of this embodiment further includes a dimming circuit 19B. The dimming circuit 19B is detachably connected to the connector 17. In one embodiment, the dimming circuit 19B can be an analog dimming circuit, PWM dimming circuit, Triac dimming circuit, or other similar dimming circuits.

The dimming circuit 19B can also directly receive a dimming signal. The users can operate an electronic device (such as smartphone, tablet, etc.) to transmit the dimming signal to the dimming circuit 19B. Then, the dimming circuit 19B transmits the dimming signal to the dimming signal converter 18. Subsequently, the dimming signal converter 18 converts the dimming signal into a modulation signal Ms (such as PWM signal). Then, the controller 13 generates a control signal Cs based on the modulation signal Ms to control the DC/DC constant-current power circuit 12, thereby performing the dimming function (increasing or decreasing the brightness of the lighting device 1).

As set forth above, the lighting device 1 has a connector 17, which can be used to connect the intelligent module 19A and the dimming circuit 19B. The intelligent module can be a Bluetooth controller, WIFI controller, ZigBee controller, infrared sensor, microwave sensor, or other similar components. The dimming circuit 19B can be an analog dimming circuit, PWM dimming circuit, Triac dimming circuit, or other similar dimming circuits. Therefore, the lighting device 1 can realize various intelligent control functions and/or intelligent dimming functions, so the lighting device 1 is applicable to various intelligent applications. Thus, the application of the lighting device 1 can be more extensive and flexible.

Similarly, in this embodiment, the lighting device 1 also has the adaptive power adjustment function, so that the total output power of the lighting device 1 always matches the operational load units. Through the adaptive power adjustment function, the lighting device 1 can operate efficiently.

The embodiment just exemplifies the present invention and is not intended to limit the scope of the present invention; any equivalent modification and variation according to the spirit of the present invention is to be also included within the scope of the following claims and their equivalents.

Figure 5:
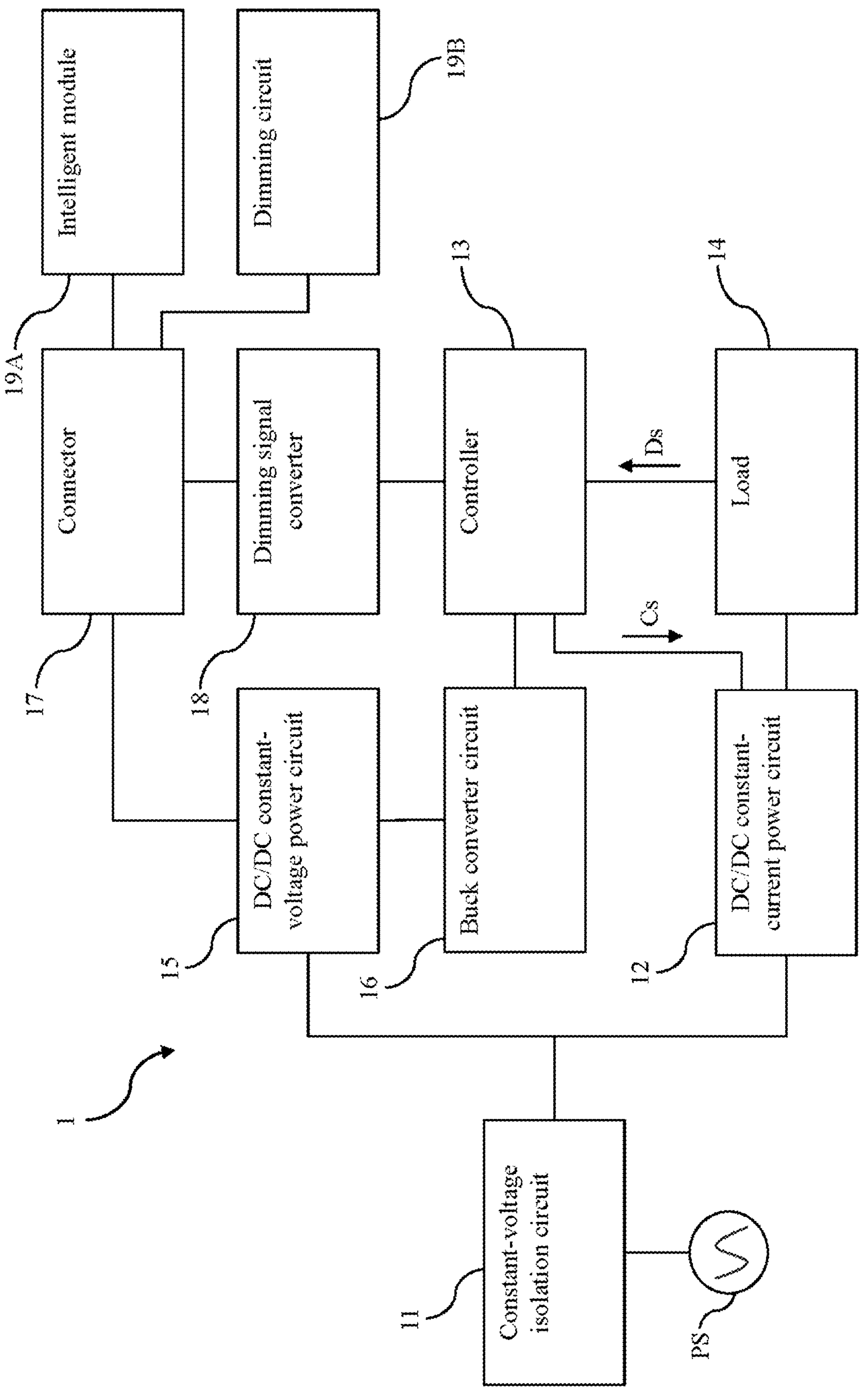
FIG. 5 is a schematic view of the lighting device in operation in accordance with another embodiment of the present invention.

Please refer to FIG. 5, which is a schematic view of the lighting device in operation in accordance with another embodiment of the present invention. As shown in FIG. 5, the controller 13 detects the operational status of each load unit of the load 14 to generate a detection result Ds. Then, the controller 13 generates a control signal Cs based on the detection result Ds to control the DC/DC constant-current power circuit 12 to adjust the total output power.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device includes a constant-voltage isolation circuit, a DC/DC constant-current power circuit, a controller and a load. The constant-voltage isolation circuit is connected to an external power source. The DC/DC constant-current power circuit is connected to the constant-voltage isolation circuit. The controller is connected to the DC/DC constant-current power circuit. The load includes a plurality of load units. The load is connected to the controller and the DC/DC constant-current power circuit. The controller detects the operational status of each of the load units to generate a detection result, and controls the DC/DC constant-current power circuit according to the detection result so as to adjust a total output power. Therefore, the lighting device can provide the adaptive power adjustment function in order to make sure that the total output power of the lighting device always matches the load units not malfunctioning, which can reduce the failure rate of these load units. Consequently, the lighting device can achieve high resource utilization rates, and the reliability thereof can be effectively enhanced.

Besides, according to one embodiment of the present invention, the lighting device has the adaptive power adjustment function, such that the total output power of the lighting device always matches the load units not malfunctioning. Through this adaptive power adjustment function, the lighting device can operate efficiently. Therefore, the lighting device can save more energy, so the lighting device can conform to the future development trend.

Further, according to one embodiment of the present invention, the DC/DC constant-current power circuit of the lighting device is connected to an external power source via the constant-voltage isolation circuit. The combination of the DC/DC constant-current power circuit and the constant-voltage isolation circuit effectively prevents the lighting device from producing flickering, which can provide the user with a better user experience so as to meet actual requirements.

Moreover, according to one embodiment of the present invention, the lighting device has a connector, which can be used to connect an intelligent module and/or a dimming circuit. The intelligent module may be a Bluetooth controller, WiFi controller, ZigBee controller, infrared sensor, microwave sensor, or similar component. Therefore, the lighting device can achieve various intelligent control and/or intelligent dimming functions in order to meet the requirements of various intelligent applications. Consequently, the lighting device can be more comprehensive in applicant and more flexible in use.

Furthermore, according to one embodiment of the present invention, the design of the lighting device is simple and the lighting device has a specially-designed adaptive power adjustment function. Thereof, the lighting device can achieve the desired technical effects without significantly increasing the cost thereof, Therefore, the lighting device can effectively address the problems of prior art.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device with adaptive power adjustment function, comprising:

a constant-voltage isolation circuit connected to an external power source;

a DC/DC constant-current power circuit connected to the constant-voltage isolation circuit;

a controller connected to the DC/DC constant-current power circuit; and a load comprising a plurality of load units, wherein the load is connected to the controller and the DC/DC constant-current power circuit;

wherein the controller detects an operational status of each of the load units to generate a detection result, and the detection result is a number of load units not malfunctioning among the load units, wherein the controller multiplies the number of the load units not malfunctioning by a default power unit to obtain a total output power.

2. The lighting device with adaptive power adjustment function as claimed in claim 1, wherein the load units are light-emitting diode light source modules.

3. The lighting device with adaptive power adjustment function as claimed in claim 1, further comprising a DC/DC constant-voltage power circuit and a connector, wherein the DC/DC constant-voltage power circuit is connected to the constant-voltage isolation circuit and the controller, and the connector is connected to the DC/DC constant-voltage power circuit and the controller.

4. The lighting device with adaptive power adjustment function as claimed in claim 3, further comprising a buck converter circuit, wherein the DC/DC constant-voltage power circuit is connected to the controller via the buck converter circuit.

5. The lighting device with adaptive power adjustment function as claimed in claim 3, further comprising a dimming circuit connected to the connector.

6. The lighting device with adaptive power adjustment function as claimed in claim 3, further comprising an intelligent module connected to the connector.

7. The lighting device with adaptive power adjustment function as claimed in claim 6, wherein the intelligent module is a Bluetooth controller, a WiFi controller, a ZigBee controller, an infrared sensor, or a microwave sensor.

8. The lighting device with adaptive power adjustment function as claimed in claim 1, wherein the controller is a microcontroller unit, central processing unit, an application-specific integrated circuit, or a field programmable gate array.

* * * * *